Patented Nov. 6, 1923.

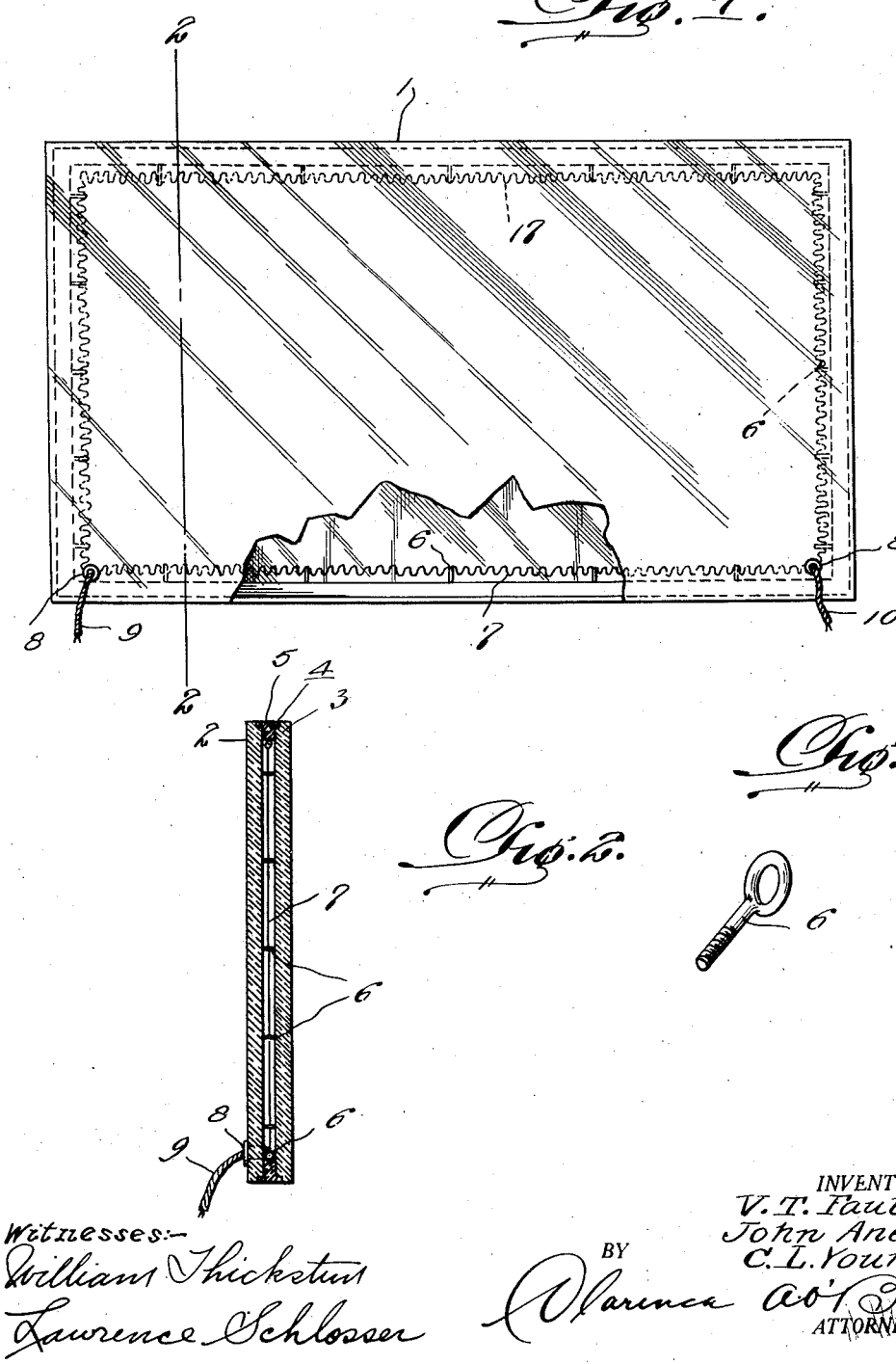

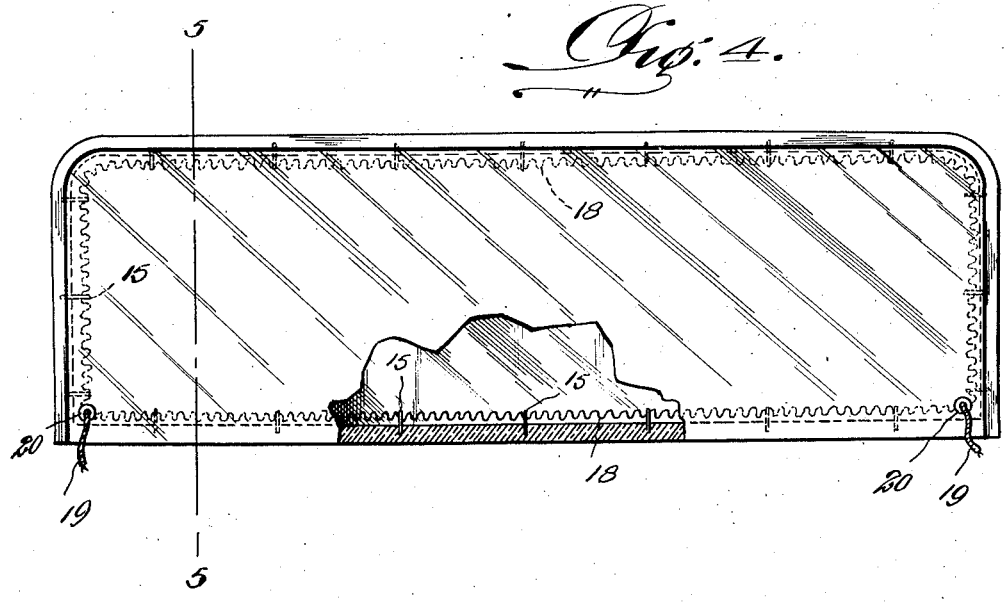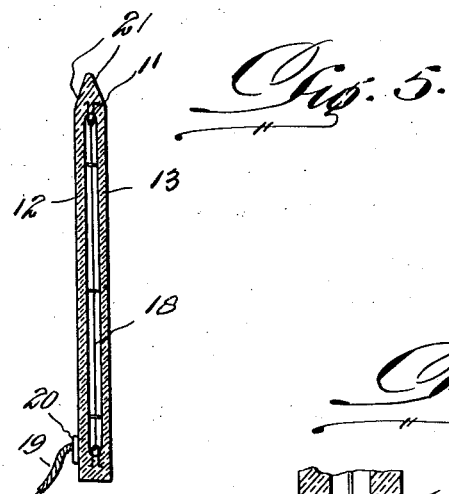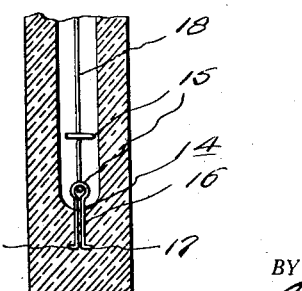

1,473,029

UNITED STATES PATENT OFFICE.

VICTOR T. FAUBERT, JOHN ANEKEE, AND CARL L. YOUNG, OF AMARILLO, TEXAS.

CLEAR-VISION DEVICE.

Application filed May 1, 1922. Serial No. 557,640.

*To all whom it may concern:*

Be it known that we, VICTOR T. FAUBERT, JOHN ANEKEE, and CARL L. YOUNG, residing at Amarillo, in the county of Potter and State of Texas, have invented new and useful Improvements in a Clear-Vision Device, of which the following is a specification.

In carrying out the present invention it is our purpose to provide moisture dissipating means for use in connection with window glass, automobile wind shield glass and other glass exposed to the elements, whereby moisture accumulating upon the glass may be dissipated so that there will be no interference with the vision.

It is also our purpose to provide moisture dissipating means of the class described which will embrace the desired features of simplicity, efficiency and durability, which may be manufactured and sold at small cost and which will operate thoroughly and effectively under all conditions.

With the above recited objects in view, and others of a like nature, the invention resides in the construction, combination and arrangement of parts set forth in and falling within the scope of the appended claims.

In the accompanying drawings:

Figure 1 is a view in elevation of a section of glass constructed in accordance with our invention and equipped with our improved moisture dissipating means, parts being broken away.

Figure 2 is a sectional view on the line 2—2 of Figure 1.

Figure 3 is a perspective view of one of the eye members for holding the heating coil.

Figure 4 is a view in elevation of a top portion of an automobile wind shield glass constructed in accordance with our invention.

Figure 5 is a sectional view on the line 5—5 of Figure 4.

Figure 6 is an enlarged fragmentary sectional view.

Figure 7 is a perspective view of the eye member employed in connection with the invention shown in Figures 4, 5 and 6.

Referring now to the drawings in detail, and particularly the form of our invention shown in Figures 1, 2 and 3, 1 designates a section of glass composed of what we term inner and outer walls 2 and 3 respectively. These walls 2 and 3 are spaced apart and lie parallel with each other, as clearly illustrated in Figure 2. The confronting surfaces of the walls 2 and 3 at the marginal edges thereof are rabbeted as at 4 and interposed between the confronting surfaces of the walls 2 and 3 at the marginal edges thereof are strips of insulating material 5, which, in the present instance, are T-shaped in cross section, the head portion of the T-shaped insulating sections lying within the rabbeted portions of the walls, and the stems contacting with the confronting faces of the walls contiguous to the rabbeted portions thereof, as clearly illustrated in Figure 2 of the drawings. This insulating material forms the side and end walls of the space between the walls 2 and 3, and suitably anchored in the insulating material are eye bolts 6 appropriately spaced apart. 7 designates conventionally a heating element adapted to be electrically energized, and in the present instance this element is threaded through the eye bolts 6 and retained in position between the walls 2 and 3 by the eye bolts, the eye bolts holding the element adjacent to the marginal edges of the glass section.

In this form of our invention the inner wall 2 is formed with inlet and outlet openings 8 through which pass the conductors 9 and 10 respectively that supply the element with current so that such element may be energized.

In practice, as the current flows through the element, such current generates heat within the space between the walls 2 and 3, and this heat acts to dissipate any moisture that may tend to accumulate upon the outer surfaces of the glass, thereby rendering the glass completely transparent under all conditions.

In the construction shown in Figures 4 to 7 inclusive of the drawings, we have shown our invention as applied to the top portion of a wind shield of a motor vehicle, and the glass indicated by the numeral 11 is composed of front and rear walls 12 and 13 that are formed integral with each other at the marginal edges of the walls 12 and 13, as clearly shown in Figures 5 and 6. The many portions of these walls 12 and 13 are spaced apart to provide a chamber or space for the heat, and the top, bottom and end walls of this chamber are formed by the marginal portions of the walls 12 and 13 and anchored in top, bottom and end walls of the chamber are eye pieces 14, each of which in the present instance is composed of a length of wire bent upon itself to provide a loop 15, parallel legs 16, outturned retaining lugs 17, the legs and retaining lugs being embedded in the glass in the formation or molding thereof. Threaded through the looped portions 15 is the conventionally shown heating element 18 that lies at the marginal edges of the chamber formed by the front and rear walls 12 and 13. This element 18 is connected with supply wires 19 that extend through openings 20 formed in the rear wall 12 adjacent to the bottom edge thereof. When current is supplied to the element 18 the heat generated within the chamber or space between the front and rear walls acts to dissipate the moisture on the wind shield.

In the form of our invention shown in Figures 4 to 7 inclusive, the top edge of the glass is beveled as at 21, in order to fit into the supporting frame of the wind shield.

While we have herein shown and described one preferred form of our invention by way of illustration, we wish it to be understood that we do not limit or confine ourselves to the precise details of construction herein shown and described, as modifications and variations may be made within the scope of the claims and without departing from the spirit of our invention.

Having thus described our invention, what we claim as new, is:—

1. A clear vision panel or device comprising inner and outer walls spaced apart and connected together at the marginal edges, eye members embedded in the margins and forming the end marginal edges, and an electrically energizable heating element carried by the eye members and lying adjacent to the marginal edges thereof whereby moisture accumulating upon the walls may be dissipated.

2. In combination with a transparent pane of vitreous material including an inner and outer wall fused together, of a heating element arranged therein and extending around its marginal edges and adapted to be connected with a source of electrical energy and eyes disposed between the walls of the vitreous pane and receiving the heating element.

In testimony whereof we affix our signatures.

VICTOR T. FAUBERT.
JOHN ANEKEE.
CARL L. YOUNG.